(12) United States Patent
Schmitt et al.

(10) Patent No.: US 8,351,934 B1
(45) Date of Patent: Jan. 8, 2013

(54) OVER THE AIR PASSIVE DOWNLOADS

(75) Inventors: James Allen Schmitt, Shawnee, KS (US); Sarah Ann Vida Persson, Olathe, KS (US); Lei Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 435 days.

(21) Appl. No.: 12/628,606

(22) Filed: Dec. 1, 2009

(51) Int. Cl.
*H04W 4/00* (2009.01)
*H04M 3/00* (2006.01)

(52) U.S. Cl. .................. 455/433; 455/435.1; 455/419

(58) Field of Classification Search ............... 455/435.1, 455/419, 433
See application file for complete search history.

(56) References Cited

U.S. PATENT DOCUMENTS

| | | | | |
|---|---|---|---|---|
| 6,564,055 | B1 * | 5/2003 | Hronek .................. | 455/433 |
| 2007/0169099 | A1 * | 7/2007 | Rao et al. .................. | 717/168 |
| 2010/0210246 | A1 * | 8/2010 | Yang et al. .................. | 455/412.1 |

OTHER PUBLICATIONS

"Mformation Service Manager for WIMAX, A software solution for remote management of WiMAX devices and services", mFormation Technologies Inc., Retrieved Date: Sep. 23, 2009, http://www.mformation.com/our-products/mformation-service-manager-for-wimax.
"CDMA Configuration Manager, OTA activation and configuration of mobile CDMA devices", mFormation Technologies Inc., Retrieved Date: Sep. 23, 2009, http://www.mformation.com/our-products/cdma-configuration-manager.
"CDMA Handset Provisioning, CDMA Handset Activation and Configuration Out of the Box", mFormation Technologies Inc., Retrieved Date: Sep. 23, 2009, http://www.mformation.com/our-solutions/cdma-handset-provisioning.
"CDMA OTA Provisioning, Activate Phones Quickly With Soaring Success Rates", Interop Technologies, 2009.
"Mformation and Bridgewater Systems Partner to Support Seamless Service Delivery over WiMAX Networks, Integrated solution enables zero-touch provisioning and management of WiMAX devices", mFormation Technologies Inc., Jun. 16, 2008, Edison, New Jersey, USA and Ottawa, Canada, http://www.mformation.com/mformation-news/press-releases/mformation-bridgewater-systems-partner.
Rakesh Kushwaha, "Mobile Handset Design Line: Mobile Device Management (MDM): Ensure a full range of services", mFormation Technologies Inc., Retrieved Date: Sep. 23, 2009, http://www.mformation.com/mformation-news/bylines/mobile-handset-design-line-mobile-device-management-mdm-ensure-a-full-range-of-services.

* cited by examiner

*Primary Examiner* — Kamran Afshar
*Assistant Examiner* — Omoniyi Obayanju

(57) ABSTRACT

A computer-implemented method, computer-readable media, and wireless system that passively provisions wireless devices over the air are provided. The wireless system includes a database, handset configuration manager, and radio network controller. The database stores updates for the wireless devices and indications of which wireless devices received the updates. The handset configuration manager provides updates for wireless devices available in the database. The wireless devices connect to a communication network associated with a network service provider that implements the handset configuration manager. The radio network controller communicates with wireless devices by establishing a slot 0 communication session with the wireless devices after receiving a registration notification from the wireless devices.

20 Claims, 7 Drawing Sheets

OVER THE AIR PASSIVE DOWNLOADS

SUMMARY

Embodiments of the invention are defined by the claims below. Embodiments of the invention provide wireless systems, methods, and computer-readable media for, among other things, updating configuration information for a wireless device. The embodiments of the invention have several practical applications in the technical arts including updating preferred roaming lists, reducing number of short message service (SMS) messages transmitted in a wireless network, and providing a mechanism for tracking configurations for wireless devices.

In a first embodiment, a computer-implemented method to update a wireless device's configuration is provided. The computer-implemented method is executed by a wireless system that is configured with a database having updates for a group of wireless devices. The wireless system provides the updates to a wireless device when the wireless device establishes a registration notification session with the wireless system.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the invention are described in detail below with reference to the attached drawing figures, which are incorporated by reference herein and wherein.

DETAILED DESCRIPTION

Figure 1:
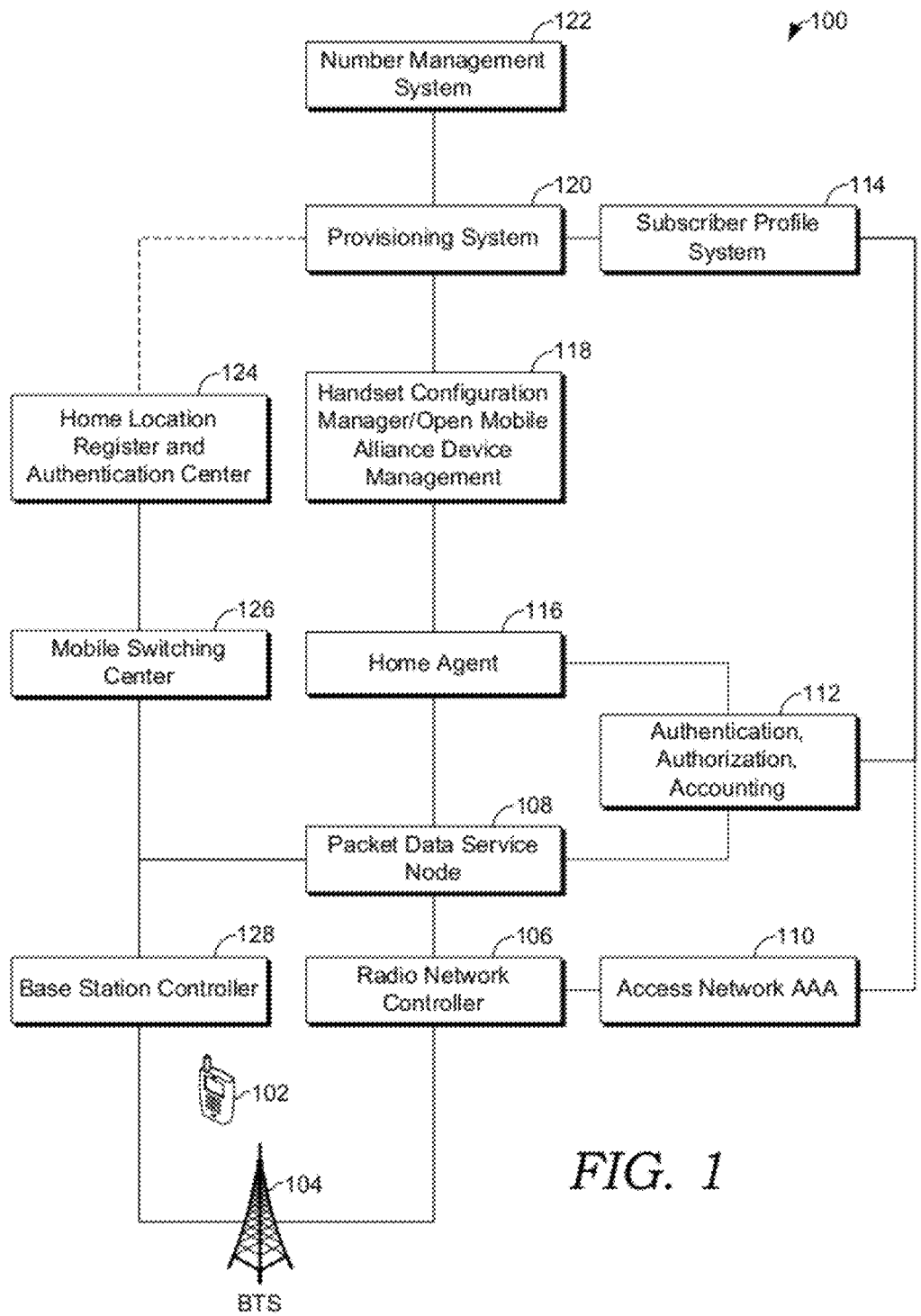
FIG. 1 is an exemplary network diagram that illustrates a wireless system, in accordance with embodiments of the invention.

Embodiments of the invention provide wireless systems, computer-readable media, and computer-implemented methods for updating configuration information for wireless devices. The wireless devices establish a communication session with the wireless system during power up, or when signal conditions degrade. During the communication session, the wireless system determines whether a wireless device has received the most recent updates. The updates include preferred roaming lists (PRL), software updates, or firmware updates. The software updates may be updates to game applications, event capture applications, browsing applications, editing applications, etc. The firmware update may include updates to device encryption, updates to memory management, updates to network management, etc. The wireless devices are able to receive the updates without use of a SMS message. In turn, the wireless system updates a database storing the updates to indicate which wireless devices received the update.

In certain embodiments, the wireless system provides passive downloads of configuration updates of the wireless device and eliminates proxy push gateways (PPG), short message servicing centers (SMSCs), and wireless access protocol push. In the wireless system an update available notification is no longer sent to the wireless device. Rather, the wireless system is configured to provide targeted updates to the wireless device at the next network registration, e.g., power on, change networks, recovering after loss of coverage, etc. For instance, the wireless system allows a wireless device to receive additional updates at each subsequent power-up.

The wireless system may eliminate approximately 150,000 to 300,000 SMS messages that are generated daily to notify wireless devices for available updates. The wireless system also eliminates retry messages that were generated when the initial SMS message failed to reach the wireless devices. The wireless system provides downloadable payloads that are retrieved by wireless devices without SMS messaging, which improves download success rates and reduces turn-around time for completing downloads to targeted wireless devices. The wireless system improves success rates for updates to the wireless devices because all downloads will be sent to the devices that are currently on the service provider's network, devices that are in a registration mode and cannot conduct in-bound communications or outbound communications, or devices that accept updates without user interaction. The wireless system includes a database that tracks current updates installed on the wireless device. The database may be accessible by a help center to troubleshoot the wireless device and improve likelihood of first-call resolution of reported problems. The database reduces the need to indiscriminately have wireless devices receive overwrites of their existing configuration. The database may be used to perform real-time testing of updates on test wireless devices.

Additionally, the database may provide custom PRLs that are based on a geographic location. For instance, a unique PRL might be downloaded as the device registers at a new location. For instance, a wireless device that temporarily visits Tampa, Fla. from Washington, D.C. may be updated with a PRL for Tampa. A custom PRL for devices registering in Tampa may specify the least-cost roaming partner if the wireless device's service provider is unavailable. This may prevent the wireless device from roaming to more expensive wireless networks.

Throughout the description of the embodiments of the invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the embodiments of the invention. The following is a list of these acronyms:

| | |
|---|---|
| 1 × RTT | 1× Radio Transmission Technology |
| AAA | Authentication Authorization Accounting |
| AC | Authentication Center |
| BTS | Base Transceiver station |
| CD-ROM | Compact Disc-Read Only Memory |
| DM | Device Management |
| DVD | Digital Versatile Discs |
| EEPROM | Electronically Erasable Programmable Read Only Memory |
| ESN | Electronic Serial Number |
| HCM | Handset Configuration Manager |
| HLR | Home Location Register |
| IOTA | Internet Over The Air |
| IP | Internet Protocol |
| LDAP | Lightweight Directory Access Protocol |
| OMA | Open Mobile Alliance |
| OSGI | Open Service Gateway Initiative |
| MEID | Mobile Equipment Identifier |
| MSC | Mobile Switching Center |
| NMS | Number Management System |
| NSP | Network Services Provisioning |
| PDA | Personal Data Assistant |
| PDSN | Packet Data Switching Network |
| PRL | Preferred Roaming List |
| PS | Provisioning System |
| RAM | Random Access Memory |
| ROM | Read Only Memory |
| SMS | Short Message Service |
| SMSC | Short Messaging Service Center |
| SPS | Subscriber Profile System |
| SSL | Secure Sockets Layer |

As one skilled in the art will appreciate, embodiments of the invention include, among other things: a method, wireless system, and a computer-program product. Accordingly, the embodiments may take the form of a hardware embodiment, firmware embodiment, a software embodiment, or an embodiment combining software and hardware. In one embodiment, the computer-program product includes computer-useable instructions embodied on one or more computer-readable media for updating configuration information.

Computer-readable media include both volatile and nonvolatile media, removable and nonremovable media, and contemplates media readable by a database, a switch, and various other network resources. Network switches, routers, firewalls, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

A wireless system provides updates to wireless devices in response to a registration notification. The updates are stored in a database. In some embodiments, the database is populated by an administrator for the service provider's network. In some embodiments, the wireless device is unable to receive inbound or outbound communications while the wireless device is receiving the update from the database.

FIG. 1 is an exemplary network diagram that illustrates a wireless system 100, in accordance with embodiments of the invention. The wireless system 100 includes a wireless device 102, BTS 104, radio network controller 106, PDSN 108, Access Network to AAA 110, AAA 112, subscriber profile system 114, home agent 116, handset configuration manager (HCM) 118, provisioning system 120, number management system 122, home location register and authentication center 124, mobile switching center 126, and base station controller 128. The wireless system is part of a telecommunication network for a service provider.

The wireless devices 102 are configured to connect to the BTS 104. The wireless devices 102 include computers, laptops, personal digital assistants, smartphones, modems, or any other computing device. The wireless devices 102 may communicate wirelessly using mobile broadband, such as, e.g., EVDO or 1xRTT. The wireless devices 102 are operated by a user to initiate communications with wireless devices 102 or other network resources. The wireless devices 102 may receive configuration updates from the HCM 118. In some embodiments, the wireless devices 102 store and execute the configuration updates during a registration notification communication session with the BTS 104. The registration notification communication session may occur over a slot 0 channel.

The BTS 104 is an antenna that enables wireless communication between the HCM 118 and the wireless device 102. The BTS 104 wirelessly connects the wireless devices 102 to the HCM 118. The BTS 104 may measure network conditions, e.g., signal-to-noise ratios, bandwidth availability, and throughput. Alternatively, the wireless devices 102 may transmit measured network conditions for storage by the BTS 104. The network conditions measured by the wireless devices 102 may be used to trigger a registration notification request.

The radio network controller 106 connects to the BTS 104. The radio network controller 106 may provide mobility management for the wireless devices 102. The radio network controller (RNC) 106 may schedule packets that are received from the PDSN 108 for delivery to the wireless devices 102 via the BTS 104. In one embodiment, the radio network controller 106 may be used to provide access to wireless devices 102 that are using EVDO.

The PDSN 108 receives packets from the home agent 116 for the wireless devices 102. The PDSN 108 routes the packets to the appropriate BTS 104. In turn, the packets are delivered to the wireless devices 102. The PDSN 108 may be connected to the radio network controller 106 or the base station controller 128. The packets received from the PDSN 108 are processed by the radio network controller 106 or the base station controller 128 to determine the appropriate BTS 104 that should received packets destined for the wireless devices 102.

The access network to AAA 110 is traversed via the radio network controller 106. In one embodiment, the access network to AAA 110 may be a firewall for the AAA 112. The radio network controller submits authorization data from the wireless device 102 to the access network to AAA 110. In turn, the access network to AAA 110 determines whether to route the data to the AAA 112.

The AAA 112 provides some security control in the wireless system 100. The AAA 112 is connected to the radio network controller 106, PDSN 108, and home agent 116. The AAA 112 provides access control, authentication, authorization, and accounting in the wireless system 100. The AAA 112 may control access to the subscriber profile system 114 and may specify read or write permissions for the radio network controller 106, PDSN 108, access network to AAA 110, home agent 116, or base station controller 128. In some embodiments, the AAA 112 may use digital signatures to authenticate each device in the wireless system 100. In certain embodiments, the AAA 112 may be configured to operate only with EVDO compliant wireless devices 102.

The subscriber profile system (SPS) 114 stores the profiles for each subscriber associated with a wireless device 102 that connects to an EVDO network. The subscriber profile may include, device information such as, ESN, MEID, firmware version, software version, PRL information; and user information, such as name, mailing address, payment information, age, email, phone number, etc. The subscriber profile system 114 connects to the provisioning system 120, which schedules updates based on the subscriber profile. The subscriber profile system 114 also connects to AAA 112 which tracks and controls access to the profiles in the subscriber profile system 114.

The home agent (HA) 116 is used to store information about a wireless device 102 that has registered with the home agent 116. The home agent 116 may be used to route packets to the wireless device 102 when the wireless device 102 is visiting a location and is connected to a foreign network. In some embodiments, the home agent 116 may receive updates for the wireless device 102 while the wireless device 102 is connected to a foreign network.

The handset configuration manager (HCM) 118 is connected to the home agent 116 and provisioning system 120. The handset configuration manager 118 ensures that each wireless device 102 has the most recent updates. The handset configuration manager 118 checks a database having updates for each wireless device and indicators that specify whether the wireless device has received the corresponding update. The HCM 118 manages the IOTA indicators for each wireless device 102. In some embodiments, the handset configuration manager may be replace by an OMA-DM device as both these devices operate as device managements servers.

The provisioning system (PS) 120 is connected to the number management system 122 and the subscriber profile system 114. In an embodiment, the provisioning system may be an AMDOCS management system. The provisioning system 120 manages the updates that are scheduled for each wireless device 102. In some embodiments, the provisioning system 120 retrieves each available subscriber profile associated with each wireless device 102 that connects to the BTS 104 from the subscriber profile system 114. The subscriber profile identifies, among other things, the services requested by the subscriber associated with the wireless device 102 and updates received by the wireless devices 102 associated with the subscriber. The provisioning system 120 schedules appropriate software updates and firmware updates for the applications requested by the subscriber based on the subscriber profile. The number management system 122 receives scheduled firmware updates and software updates for the wireless devices 102 associated with the subscriber. In turn, the number management system 122 updates a database storing acknowledgements for updates for each wireless device 102 of the subscriber.

The number management system (NMS) 122 controls the updates to the PRLs. The number management system 122 may provide an updated listing of preferred network providers, where each network provider is assigned a priority based on cost, accessibility, speed, etc. The number management system 122 connects to PS 120. The updated PRL may be received by PS 120 and stored in a database. The NMS 122 may maintain the database that includes the wireless device identifier, such as an ESN or MEID, corresponding updates, and indicators to specify that the wireless device 102 received the corresponding update. In certain embodiments, the database may be a LDAP database that is updated by one of the NMS 122 or the provisioning system 120.

The home location register and authentication center (HLR and AC) 124 stores the profiles for each subscriber associated with a wireless device 102 that connects to a 1xRTT network. The subscriber profile may include, device information such as, ESN, MEID, firmware version, software version, PRL information and user information, such as name, mailing address, payment information, age, email, phone number, etc. The HLR and AC 124 also authenticates the subscribers and provides the functionality of the AAA 112 to 1xRTT compliant wireless devices 102. The HLR and AC 124 connects to the provisioning system 120, which schedules updates based on the subscriber profile. The HLR and AC 124 also connects to a mobile switching center 126 which provides access to the profiles in the HLR and AC 124.

The mobile switching center 126 manages the communication sessions for the wireless devices 102. The mobile switching center 126 may perform appropriate signal conversions when necessary and provide mobility management for the wireless devices. The mobile switching center 126 may connect to the public switch telephone network.

The base station controller 128 connects to the BTS 104. The base station controller is similar to the radio network controller 106. In some embodiments, the base station controller 128 provides most of the functionality for the BTS 104. In one embodiment, the base station controller 128 may be used to provide access to wireless devices 102 that are using 1xRTT. The base station controller 128 controls a collection of BTSs 104 and manages handover as wireless devices 102 move between sectors covered by each BTS 104 in the collection of the BTSs 104.

In some embodiments, the wireless device may exchange communication messages with the wireless system in one of a slot 0 communication channel or a slot 1 communication channel. In the slot 0 communication channel, the wireless device is unable to receive outbound or inbound communications and the graphical user interface on the wireless device is disabled. The IOTA indicator in subscriber profiles are used to determine which wireless devices need configuration updates.

Figure 2A:
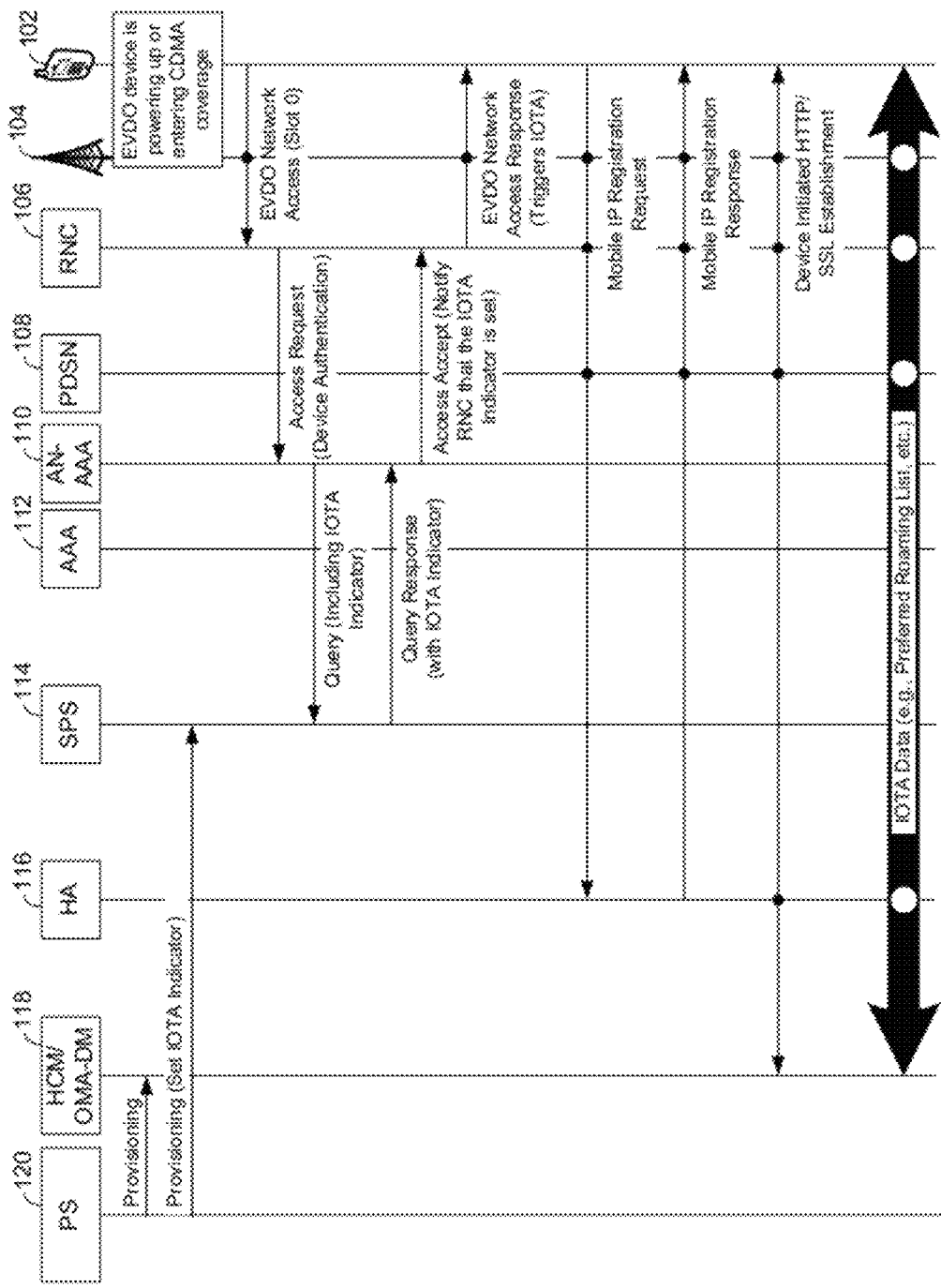
FIG. 2A is an exemplary communication diagram that illustrates communications in a wireless network, in accordance with embodiments of the invention.

FIG. 2A is an exemplary communication diagram that illustrates communications in the wireless network, in accordance with embodiments of the invention. The wireless network may be an EVDO network. The PS 120 may be configured with updates for wireless devices 102. The updates are transmitted as a provision command to the HCM 118. The HCM 118 may temporarily store updates for wireless devices that have not received updates stored in the database maintained by NMS 122. PS 120 transmit a trigger to the subscriber profile that modifies the subscriber profiles for each wireless device 102 that has not received the updates. In one embodiment, PS 120 may set an IOTA indicator in the subscriber profile for each wireless device that has not received the updates stored in the database. The provisions command may include the device information that is used to locate the subscriber profiles. In turn, SPS 114 updates the subscriber profiles with the IOTA indicator.

When the wireless device 102 powers up, recovers from a loss of coverage, experiences signal degradation, or any other specified network event, the wireless device 102 may establish a slot 0 communication with the wireless system 100. The RNC 106 receives a slot 0 initiation request. The slot 0 initiation request may include device information that identifies that wireless device 102. In turn, the RNC 106 sends a wireless access request command to the PDSN 108. The PDSN 108 packetizes the request and transmits the access request to the access network to AAA 110, which authenticates the wireless device 102. The access network to AAA 110 queries the SPS 114 to determine whether an update is available. The query may include the device information and an indicator associated with prior updates to the wireless device 102. The SPS 114 receives the packetized access request and checks the subscriber profile associated with wireless device 102 to determine whether any updates are available for the wireless device 102. The device information is used to locate the subscriber profile for the wireless device. The SPS 114 checks the subscriber profile to determine whether the IOTA indicator is set. When the IOTA indicator is set, an update for the wireless device is stored in the database. In some embodiments, the IOTA indicator may include address information for the HCM 118. The SPS 114 responds to access network to AAA 110 with an acknowledgement that IOTA indicator is set. The access network to AAA 112 confirms access by the wireless device 102 and notifies the RNC 106 via the PDSN 108 that the wireless device 102 may wirelessly communicate over the wireless system 100 that the IOTA indicator is set.

After the wireless device 102 is authenticated by AAA 112, the wireless device 102 registers with the wireless system 100 using mobile IP registration. In some embodiments, registration may include updating the HA 116 with device information for the wireless device. In turn, HA 116 acknowledges registration of the wireless device 102.

In some embodiments, the wireless system 100 may begin to push updates to wireless devices in parallel with the mobile IP registration with the HA 116. The HCM 118 may trigger an update start message when the HA 116 receives the mobile IP registration message from the wireless device 102. The update start message from the HCM 118 is transmitted to the wireless device 102, which establishes a communication session with the HCM 118 to receive the update for the wireless device 102.

In another embodiment, the HCM 118 may use the IOTA indicator to transmit an IOTA request for a wireless device 102 that has the IOTA indicator. The HCM 118 may use the device address included in the IOTA request to locate the wireless device 102. In turn, a IOTA request that includes device information, such as network address, IP address, or HA IP address, is transmitted to the RNC 106. The RNC 106 may establish a secure socket layer communication with the wireless device 102. The wireless device 102 receives the updates from the HCM 118 over the air. After the updates are received the communication session ends.

In one embodiment, the database storing the updates is accessed to record the wireless devices that received the slot 0 updates. The database may also be provisioned with additional updates for the wireless devices. In the slot 1 communication channel, the wireless device may receive both inbound and outbound communication messages.

Figure 2B:
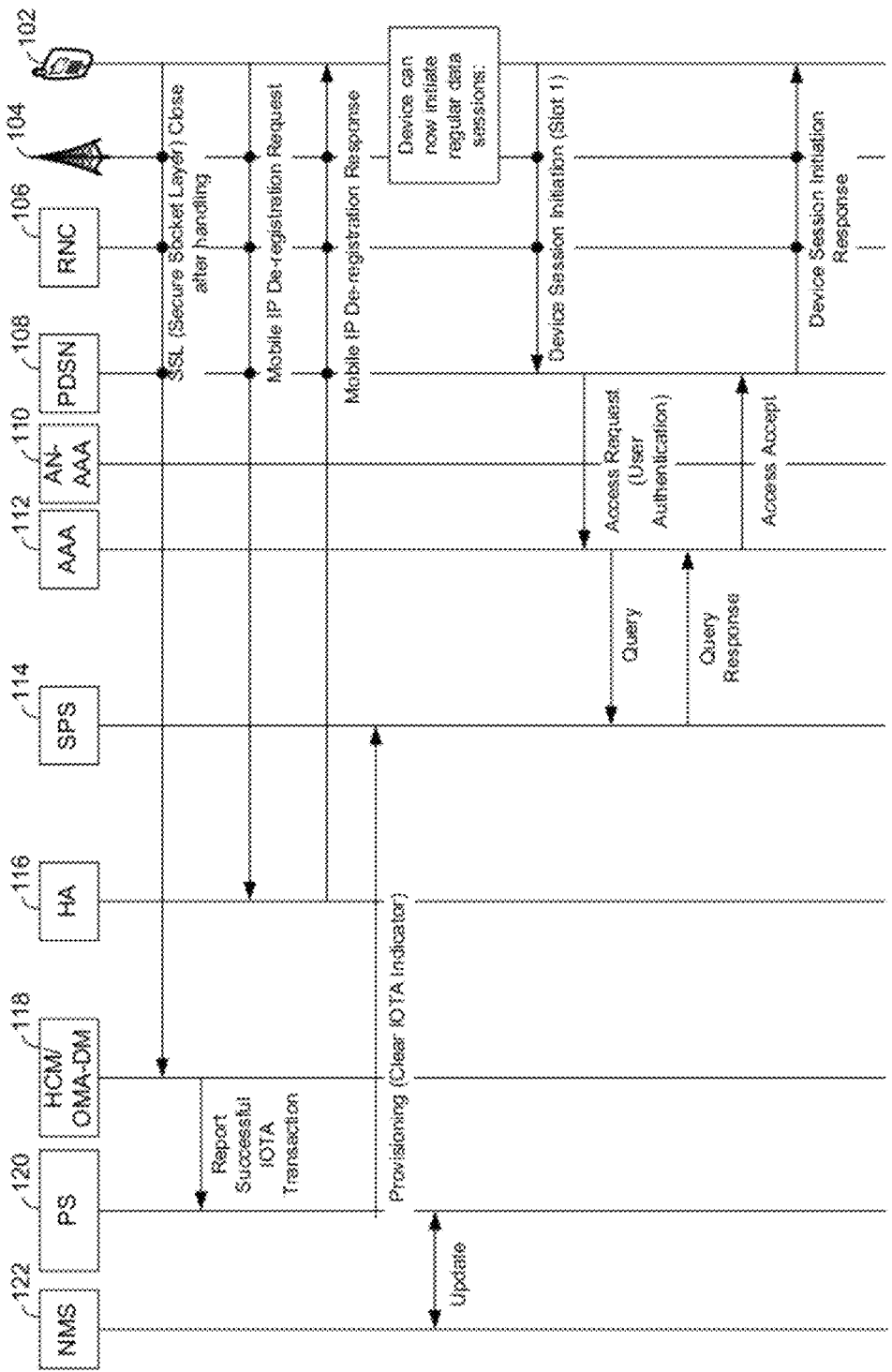
FIG. 2B is another exemplary communication diagram that continues illustration of communications in the wireless network, in accordance with embodiments of the invention.

FIG. 2B is another exemplary communication diagram that continues illustration of communications in the wireless network, in accordance with embodiments of the invention. After the updates are completely transmitted, the HCM 118 closes the SSL communication and generates an IOTA report to notify the database at the NMS 122, which wireless devices 102 received the updates. The HCM 118 transmits an updates success message that identifies each wireless device 102 that received the updates to PS 120. In turn, the message is transmitted to NMS 122.

PS 120 transmits a clear IOTA indicator to update the subscriber profiles for the wireless devices that received the updates. For wireless devices with additional updates, the subscriber profile may set the IOTA indicator or confirm that the IOTA indicator remains set.

The NMS 122 may update a database to indicate that the wireless device 102 received the updates stored in the database. If any additional updates are available from the NMS 122, the additional updates are stored in the database. In turn, the NMS 122 communicates with PS 120 to confirm successful updates to the wireless device 102.

When the wireless device 102 receives the updates, the wireless device 102 may establish a slot 1 communication with the wireless system 100. The wireless device 102 ends the registration session and begins the normal voice and data communication session. The BTS 104 receives a slot 1 initiation request from the wireless device to begin normal voice and data communication. The slot 1 initiation request may include device information that identifies that wireless device 102. In turn, the BTS 104 sends a wireless access request command to the RNC 106. The RNC 106 packetizes the request and transmits the access request to the PDSN 108, which routes the request to AAA 112. The AAA 112 obtains the packetized access request, authenticates the wireless device 102, and for each authenticated wireless device 102, communicates with SPS 114 to determine the services that are available for the wireless device 102. The device information is used to authenticate the wireless device 102 and locate the subscriber profile for the wireless device 102. The SPS 114 checks the subscriber profile to determine whether a subscriber requests both voice and data communications, or any other specification services (news services, mapping services, etc.). The SPS 114 responds to AAA 112 with the services available for the wireless device 102. The AAA 112 authenticates the wireless device 102 and notifies the RNC 106 via the PDSN 108 that the wireless device 102 may wirelessly communicate over the wireless system 100 and use the services specified in the subscriber profile.

Figure 2C:
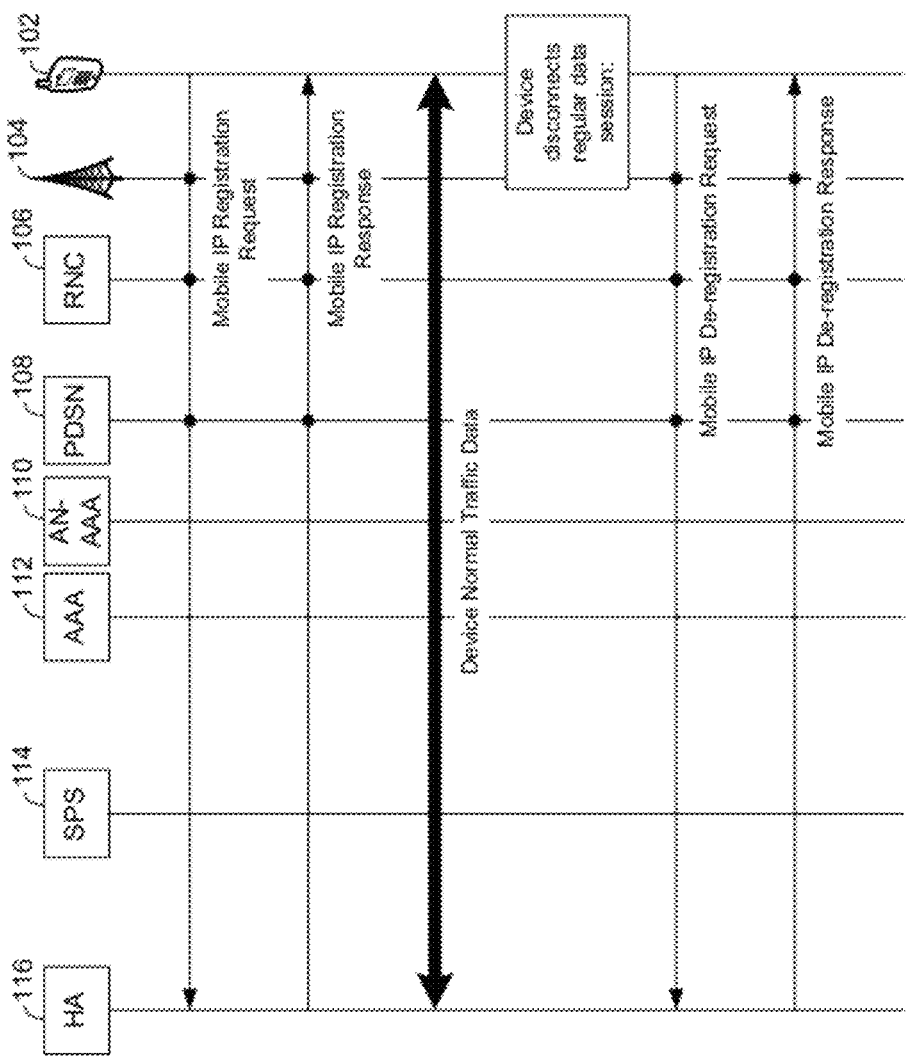
FIG. 2C is another exemplary communication diagram that continues illustration of communications in the wireless network, in accordance with embodiments of the invention.

FIG. 2C is another exemplary communication diagram that continues illustration of communications in the wireless network, in accordance with embodiments of the invention. After the wireless device 102 is authenticated by AAA 112, the wireless device 102 registers with the wireless system 100 using mobile IP registration. In some embodiments, registration may include updating the HA 116 with device information for the wireless device. In turn, HA 116 acknowledges registration of the wireless device 102 and the wireless device 102 is configured to receive both inbound and outbound communications and access to services included in the subscriber profile is allowed. When the wireless device completes all wireless communication, the wireless device may issue a mobile IP de-registration request to terminate wireless communications on the wireless system 100.

Figure 2D:
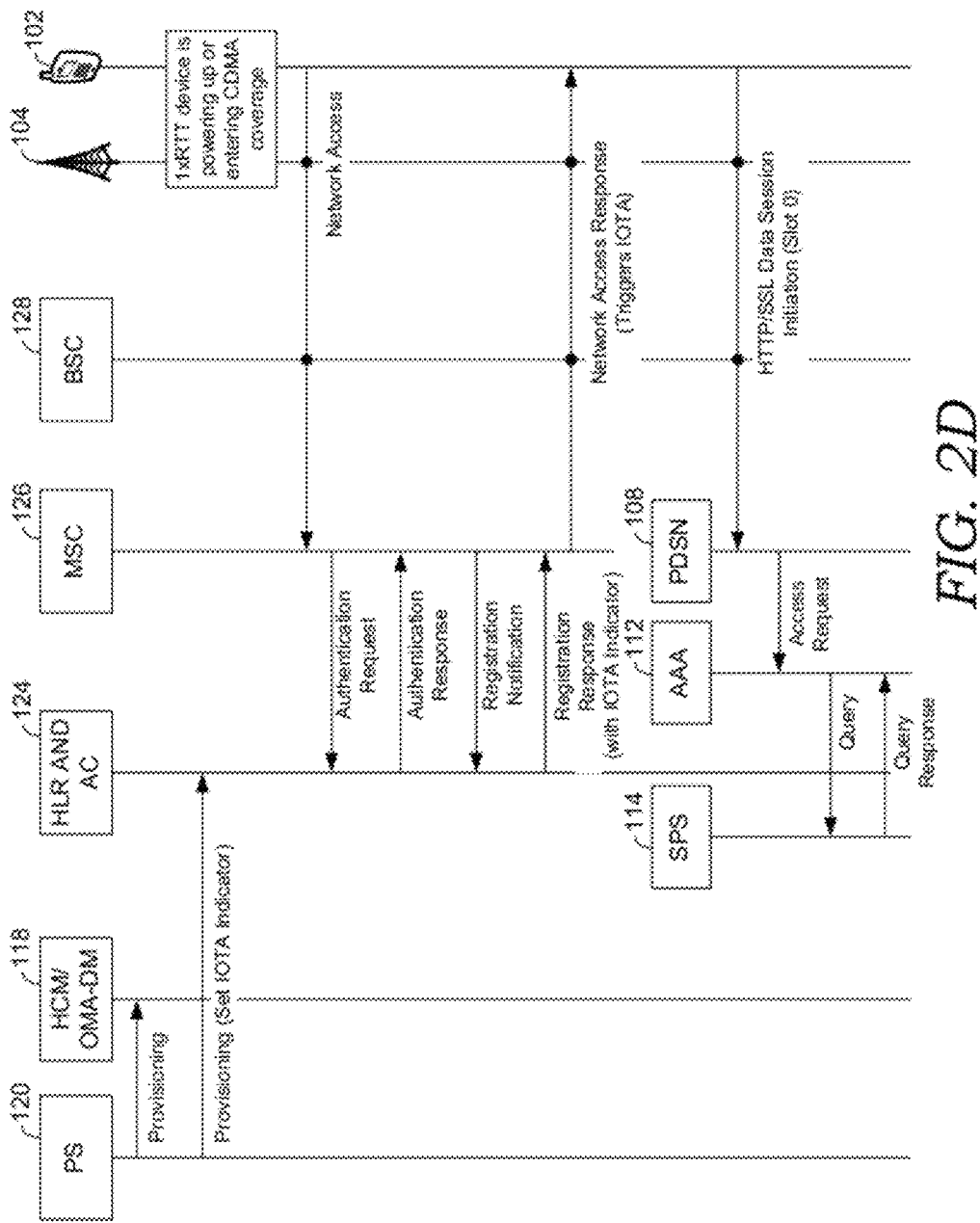
FIG. 2D is another exemplary communication diagram that illustrates communications in another wireless network, in accordance with embodiment of the invention.

FIG. 2D is another exemplary communication diagram that illustrates communications in another wireless network, in accordance with embodiments of the invention. Here, the wireless network can be an 1xRTT network. In some embodiments, the wireless devices 102 are configured to connect to either an 1xRTT interface or an EVDO interface. When an EVDO network is unavailable, the wireless devices 102 connect to the 1xRTT network.

The PS 120 may be configured with updates for wireless devices 102. The updates are transmitted as a provision command to the HCM 118. The HCM 118 may temporarily store updates for wireless devices that have not received updates stored in the database maintained by NMS 122. PS 120 transmit a trigger to the subscriber profile that modifies the subscriber profiles for each wireless device 102 that has not received the updates. The subscriber profiles, when accessing the 1xRTT network, are maintained by the HLR and AC 124. In one embodiment, PS 120 may set an IOTA indicator in the subscriber profile for each wireless device that has not received the updates stored in the database. The provisions command may include the device information that is used to locate the subscriber profiles. In turn, HLR and AC 124 updates the subscriber profiles with the IOTA indicator.

When the wireless device 102 powers up, recovers from a loss of coverage, experiences signal degradation, or any other specified network event, the wireless device 102 may establish a slot 0 communication with the wireless system 100. The BTS 104 receives an initiation request. The initiation request may include device information that identifies that wireless device 102. In turn, the BTS 104 sends a wireless access request command to the BSC 128. The BSC 128 packetizes the request and transmits the access request to the MSC 126, which routes the request to HLR and AC 124, which authenticates the wireless device. The MSC 126 sends an authentication request to the HLR and AC 124. In turn, the HLR and AC 124 generates an authentication response that includes an acknowledgement that the device is successfully authenticated.

After receiving the authentication response from the HLR and AC 124, the MSC 126 transmits a registration request for the wireless device 102 to the HLR and AC 124. The HLR and AC may respond to the registration request with an IOTA indicator that specifies an address of a network resource having updates for the wireless device. In one embodiment, the HLR and AC 124 stores all subscriber profiles, which includes indicators that specify the availability of updates for the wireless devices 102, and the actual updates. In turn the HLR and AC 124 may transmit the IOTA indicator to the wireless device 102. The wireless device 102 then uses the IOTA indicator to initiate a communication session with the network resource having the updates. When the HLR and AC 124 stores the updates, the wireless device 102 obtains the updates from the HLR and AC 124 and the subscriber profile is updated to indicate that the update was received. In turn, the NMS 122 may receive a report listing wireless devices that obtained the updates and wireless devices that have not received the updates.

In an alternate embodiment, the network resource that stores the updates may be the HCM 118 and the subscriber profiles may be stored at the SPS 114. The SPS 114 may be accessible by a wireless device that is connected to the 1xRTT network. The wireless device may transmit a packetized access request to the PDSN 108 and AAA 112 to access the SPS 114. The device information of the wireless device 102 is used to locate the subscriber profile for the wireless device 102. The SPS 114 checks the subscriber profile to determine whether the IOTA indicator is set. When the IOTA indicator is set an update for the wireless device is stored in the database. In some embodiments, the IOTA indicator may include address information for the HCM 118. The SPS 114 responds to AAA 112 with the IOTA indicator. The AAA 112 authenticates the wireless device 102.

Figure 2E:
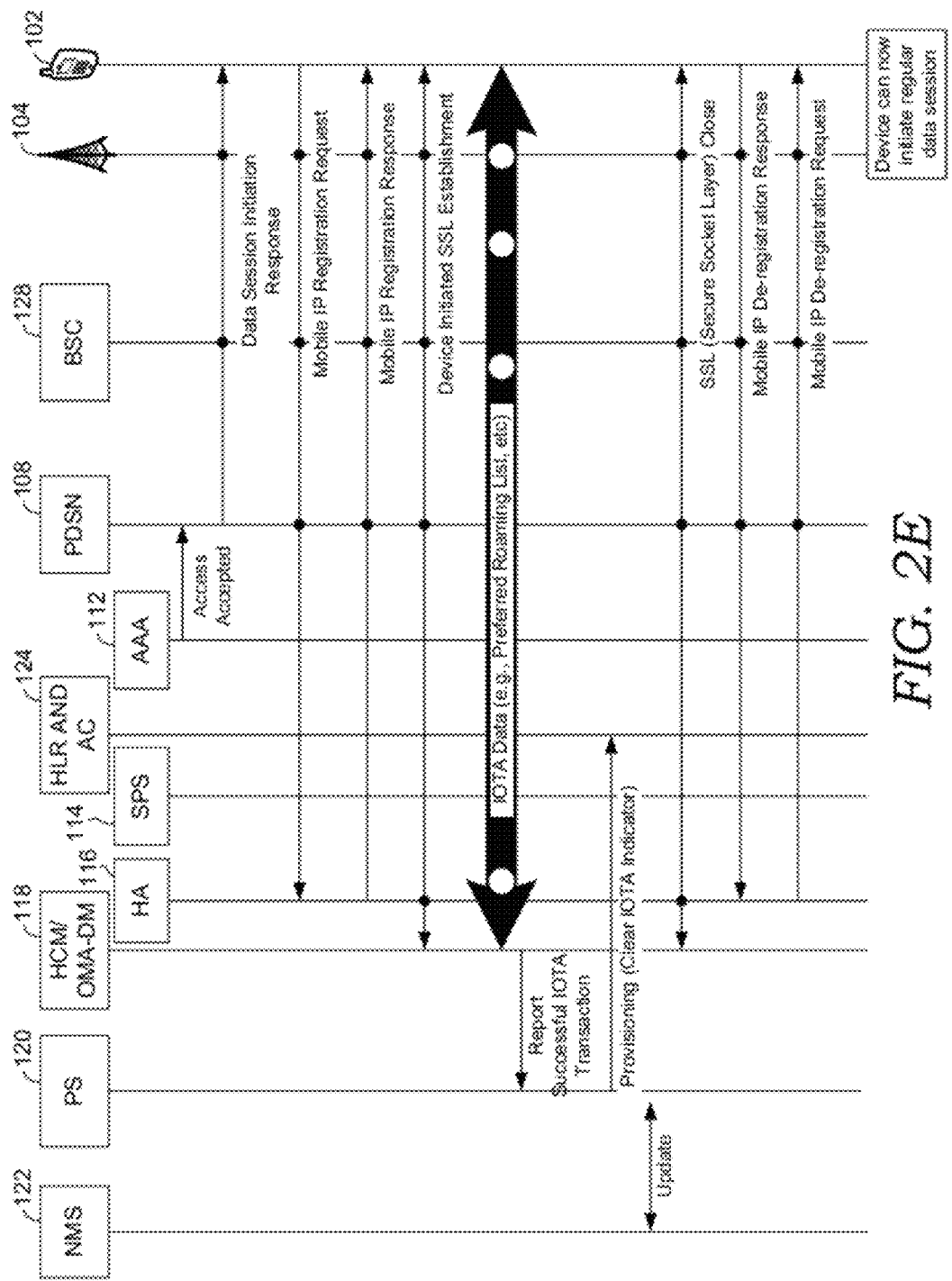
FIG. 2E is another exemplary communication diagram that continues illustration of communications in the other wireless network, in accordance with embodiments of the invention.

FIG. 2E is another exemplary communication diagram that continues illustration of communications in the other wireless network, in accordance with embodiments of the invention.

After the SPS 114 confirms that updates are available, it sends a response with the address of the HCM 118 to the wireless device 102, which initiates a communication session using the address of the HCM 118 included in the IOTA indicator. The AAA 112 notifies the wireless device 102 via the PDSN 108 that the wireless device 102 may wirelessly communicate over the wireless system 100. In turn, the wireless device 102 registers with the wireless system 100 using mobile IP registration. In some embodiments, registration may include updating the HA 116 with device information for the wireless device. The HA 116 acknowledges registration of the wireless device 102.

In some embodiments, the wireless system 100 may begin to push updates to wireless devices in parallel with the mobile IP registration with the HA 116. The PDSN 108 may trigger an update start message when the PDSN receives the mobile IP registration message from the wireless device 102. The update start message from the PDSN is transmitted to the HCM 118, which establishes a communication session with the wireless device 102 to transmit the updates for the wireless device 102. The HCM 118 may establish a secure socket layer communication with wireless device 102. In turn, the HCM 118 transmits the updates for the wireless device 102 to the wireless device 102. After the updates are completely transmitted, the HCM 118 closes the SSL communication and generates a IOTA report to notify the database at PS 120 of the wireless devices 102 that received the updates. In turn, PS 120 clears the IOTA indicators in the subscriber profiles for the wireless devices that received the updates. The subscriber profiles at HLR and AC 124 and SPS 114 are both updated accordingly. In turn, PS 120 updates the NMS 122 of the wireless devices 102 that have received the updates and the wireless devices 102 that have not received the updates. In turn, the NMS 122 transmits new updates for the wireless devices 102 to PS 120. The HCM 118 closes the communication session with the wireless device after the updates are transmitted. Additionally, the wireless device 102 transmits a mobile IP de-registration request to HA 116 when the update is received completely from the HCM 118.

The wireless system is configured with a method to update configuration information stored on wireless devices. The wireless devices may receive the updated configuration during a slot 0 communication with the wireless system. A database is maintained to identify wireless devices and updates that are available for the wireless devices. In one embodiment, the database is maintained by a service provider of the wireless system.

Figure 3:
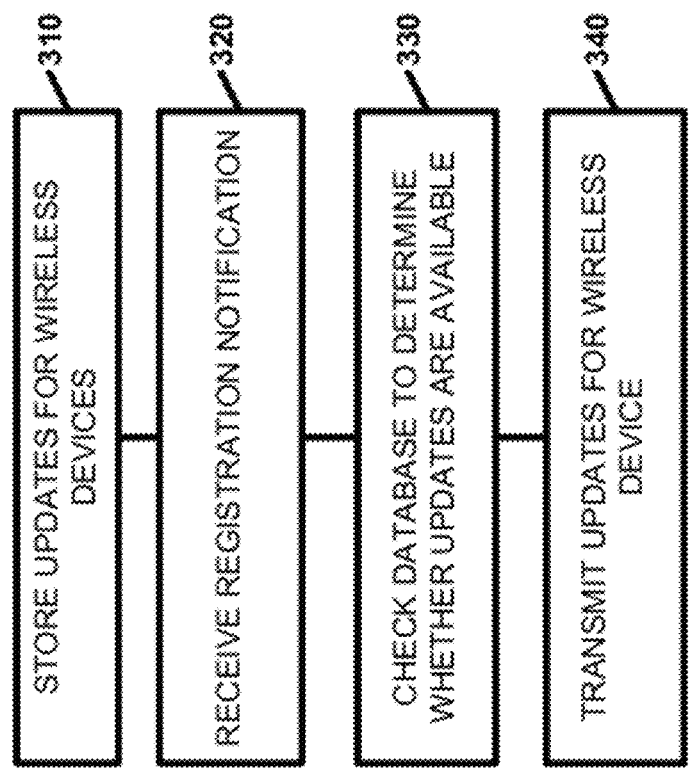
FIG. 3 is an exemplary logic diagram that illustrates a computer-implemented method updating configuration information, in accordance with an embodiment of the invention.

FIG. 3 is an exemplary logic diagram that illustrates a computer-implemented method updating configuration information, in accordance with an embodiment of the invention. In step 310, the updates for wireless devices are stored in a database. In some embodiments, the updates include preferred roaming lists that identify alternate wireless access networks that are configured to provide communication services for the wireless device, software updates or firmware updates. The database stores an update for each wireless device subscribing to a network service provider that selects updates for storage in the database.

In turn, a registration notification from a wireless device is received by the wireless system, in step 320. The registration notification may be received on a slot 0 communication channel. In some embodiments, the registration notification occurs upon powering on the wireless device, upon a change in network conditions experienced by the wireless device, upon recovering from a loss of coverage, or upon a signal-to-noise ratio falling below a specified threshold.

In step 330, the database is checked to determine whether updates are available for the wireless device. When updates are not available, the configuration of the wireless device is not updated. But, in step 340, updates for the wireless device are transmitted to the wireless device when the database has an update not previously received by the wireless device.

In an embodiment, the database is populated with the selected updates by a handset configuration manager or open mobile alliance device management. Additionally, the database may be updated to indicate that the wireless device received the update. The database may be used to generate reports to identify wireless devices that received the updates and wireless devices that have not received the updates.

Optionally, a locator for the database to the wireless device may be provided when an update is available for the wireless device. The locator may be one of an Internet protocol address or uniform resource locator. In turn, a communication session between the database and the wireless device that obtained the locator is generated.

In summary, a wireless system configured to update configuration information on wireless devices during a slot 0 communication session is provided. The wireless system includes a HCM, RNC, and database. The HCM may receive updates from the database for wireless devices, wherein the updates comprise roaming lists that specify preferred networks that provide wireless communication services to the wireless devices.

The database stores the updates for wireless devices and indications of which wireless devices have obtained the updates. The database may be maintained by a network service provider. The network service provider may obtain reports that indicate which wireless devices received the updates and which wireless devices did not receive the updates stored in the database.

The radio network controller communicates with wireless devices. The radio network controller establishes the slot 0 communication session with the wireless device after a registration notification is received from the wireless device. The wireless device is unable to receive calls or graphical user interface commands while communicating over the slot 0 communication channel.

Additional arrangements of the various components depicted, as well as components not shown, are possible without departing from the spirit and scope of the present invention. Embodiments of the invention are described with the intent to be illustrative rather than restrictive. It is understood that certain features and subcombinations are of utility and may be employed without reference to other features and subcombinations and are contemplated within the scope of the claims. Some steps listed in the various figures need be carried out in the specific order described.

The invention claimed is:

1. A computer-implemented method to update configuration information for a wireless device, the method comprising:
   storing updates for wireless devices in a database;
   receiving a registration notification from a wireless device;
   checking the database to determine whether updates are available for the wireless device; and
   when the database has an update not previously received by the wireless device:
      establishing a slot 0 communication session with the wireless device after the registration notification is received from the wireless device, the slot 0 communication session prevents the wireless device from receiving calls or graphical user interface commands while communicating over the slot 0 communication channel; and
      transmitting updates to the wireless device, without transmitting Short Message Service (SMS) communications to the wireless device.

2. The method of claim 1, wherein the updates include preferred roaming lists that identify alternate wireless access networks that are configured to provide communication services for the wireless device.

3. The method of claim 1, wherein the updates include software updates.

4. The method of claim 1, wherein the updates include firmware updates.

5. The method of claim 1, wherein the database stores an update for each wireless device subscribing to a network service provider that selects updates for storage in the database.

6. The method of claim 5, wherein the database is populated with the selected updates by a handset configuration manager or open mobile alliance device management.

7. The method of claim 1, wherein the registration notification is received on a slot 0 communication channel.

8. The method of claim 1, further comprising: providing a locator for the database to the wireless device when an update is available for the wireless device.

9. The method of claim 8, further comprising: generating a communication session between the database and the wireless device that obtained the locator.

10. The method of claim 9, wherein the locator is an Internet protocol address.

11. The method of claim 9, wherein the locator is a uniform resource locator.

12. One or more non-transitory computer-readable media storing computer-executable instructions for performing a method to update configuration information for a wireless device, the method comprising:
   storing updates for wireless devices in a database;
   receiving a registration notification from a wireless device;
   checking the database to determine whether updates are available for the wireless device;
   establishing a slot 0 communication session with the wireless device after the registration notification is received from the wireless device,
   preventing, during the slot 0 communications session, the wireless device from receiving calls or graphical user interface commands;
   transmitting updates to the wireless device, without transmitting Short Message Service (SMS) communications to the wireless device; and
   transmitting updates for the wireless device to the wireless device when the database has an update not previously received by the wireless device and the wireless device is connected to a home agent or transmitting the updates to the home agent of the wireless device for later delivery when the wireless device is connected to a foreign network.

13. The media of claim 12, further comprising: updating the database to indicate that the wireless device received the update.

14. The media of claim 13, further comprising: generating reports to identify wireless devices that received the updates and wireless devices that have not received the updates.

15. The media of claim 12, wherein the registration notification occurs after powering on the wireless device.

16. The media of claim 12, wherein the registration notification occurs after a change in network conditions experienced by the wireless device.

17. The media of claim 16, wherein the registration notification occurs after loss of coverage.

18. The media of claim 16, wherein the registration notification occurs after a signal-to-noise ratio falls below a specified threshold.

19. A wireless system, the wireless system comprising:
   a handset configuration manager configured to provide updates for wireless devices available in a database, wherein the updates comprise roaming lists that specify preferred networks that provide wireless communication services to the wireless devices;

the database is configured to store the updates for wireless devices and indications of which wireless devices have obtained the updates; and a radio network controller configured to communicate with wireless devices, wherein the radio network controller establishes a slot 0 communication session with the wireless device after a registration notification is received from the wireless device, wherein the wireless device is unable to receive calls or graphical user interface commands while communicating over the slot 0 communication channel, and the radio network controller transmits updates to the wireless device, without transmitting Short Message Service (SMS) communications to the wireless device.

20. The wireless system of claim 16, wherein the database is maintained by a network service provider and the network service provider obtains reports that indicate which wireless devices received the updates and which wireless devices did not receive the updates stored in the database.

* * * * *